G. H. TODD.
Horseshoes.

No. 145,463.  Patented Dec. 9, 1873.

WITNESSES.
P. C. Dieterich
P. Alexander

INVENTOR
George H. Todd, per:
T. H. Alexander & Co.
ATTORNEYS.

UNITED STATES PATENT OFFICE.

GEORGE H. TODD, OF MONTGOMERY, ALABAMA.

IMPROVEMENT IN HORSESHOES.

Specification forming part of Letters Patent No. 145,463, dated December 9, 1873; application filed September 27, 1873.

*To all whom it may concern:*

Be it known that I, GEORGE H. TODD, of Montgomery, in the county of Montgomery and State of Alabama, have invented certain new and useful Improvements in Horseshoes; and I do hereby declare that the following is a full, clear, and exact description thereof, reference being had to the accompanying drawings and to the letters of reference marked thereon, which form a part of this specification.

This invention relates to horseshoes, having for its object to furnish a shoe which shall receive the jar occasioned by the animal in traveling; and it consists in the improved construction and arrangement of parts, as hereinafter more fully described.

To enable others skilled in the art to which my invention appertains to make and use the same, I will now proceed to describe its construction, referring to the annexed drawing, in which—

Figure 1:
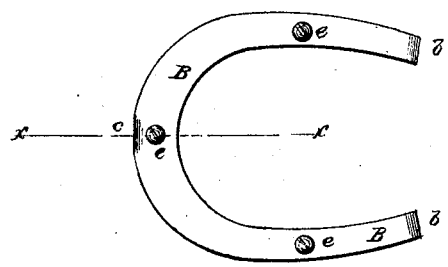
Figure 2:
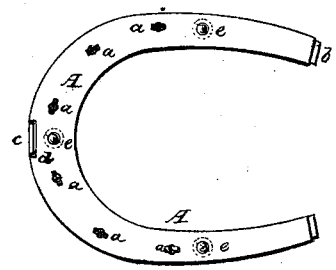
Figure 3:

Figure 1 is a bottom view of a device embodying my invention. Fig. 2 is a view of the upper plate, and Fig. 3 is a longitudinal section taken through line *x x* of Fig. 1.

A represents a foot-plate, provided with nail-holes *a*, which is fastened to the animal's hoof in the usual manner, and having a recess, *d*, at the toe or forward part thereof. B represents the bottom plate, provided with a lip, *c*, at the toe, corresponding with and fitting in the recess *d* of the plate A, and at the heel the plate B is bent so as to meet the top of the plate A. C represents a plate, of rubber or other elastic substance, which is placed between the plates A B.

In use the plate A is first put upon the animal's hoof by nails, in the usual manner. The rubber and plate B are then put upon the plate A and secured thereto by screws *e*, which pass loosely through the plate B to allow a vertical movement of the same, the lip *c* securing and protecting the rubber in front and the parts *b b* at the heel.

By these means a simple and efficient device is formed without the necessity of corrugating the plates or making a flange upon the elastic material.

Having thus fully described my invention, what I claim, and desire to secure by Letters Patent, is—

The plate A, with recess *d*, the plate B, with lip *c*, and curved or bent heel *e*, in combination with the elastic substance C, substantially as and for the purpose described.

In testimony that I claim the foregoing as my own, I affix my signature in presence of two witnesses.

GEO. H. TODD.

Witnesses:
T. S. HERBERT,
JNO. B. FULLER.